Dec. 4, 1934.   F. B. WIEGAND ET AL   1,982,716
CABLE OUTLET
Filed April 30, 1931   5 Sheets-Sheet 2
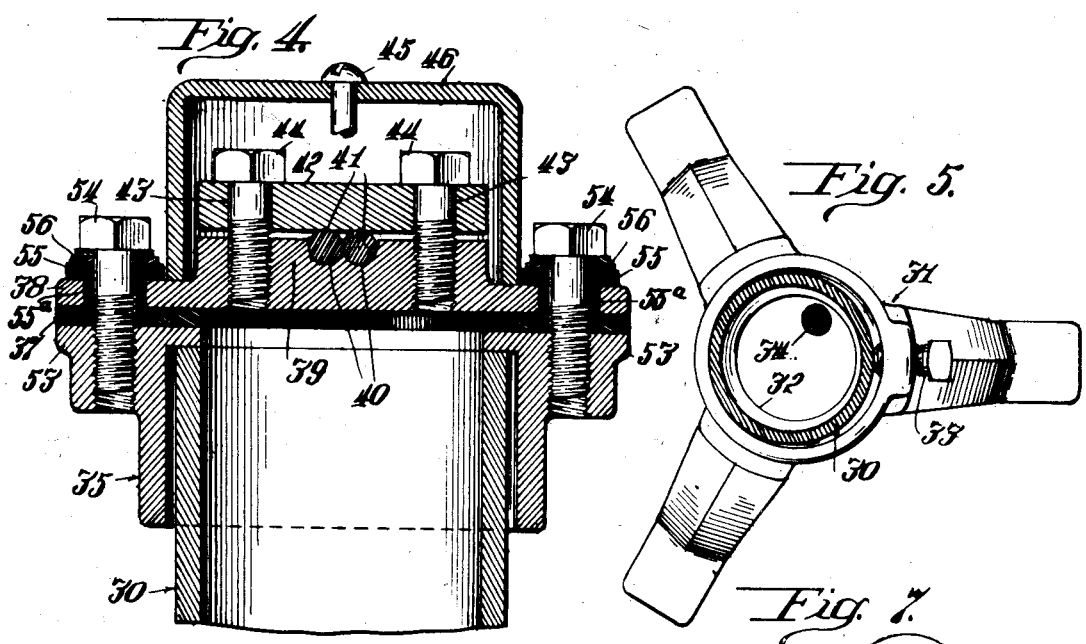
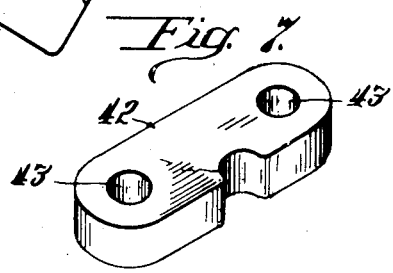
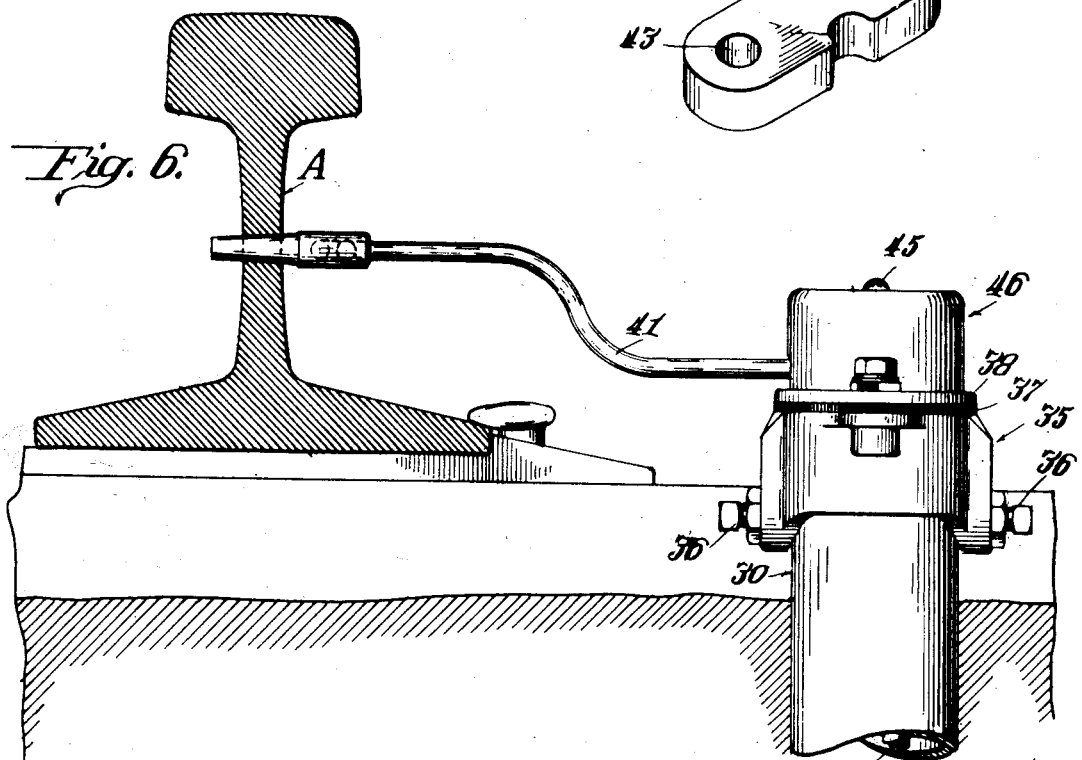
Inventors
Frederick B. Wiegand,
Bernard J. Schmidt,
Otto S. Flath,
By
Attorney

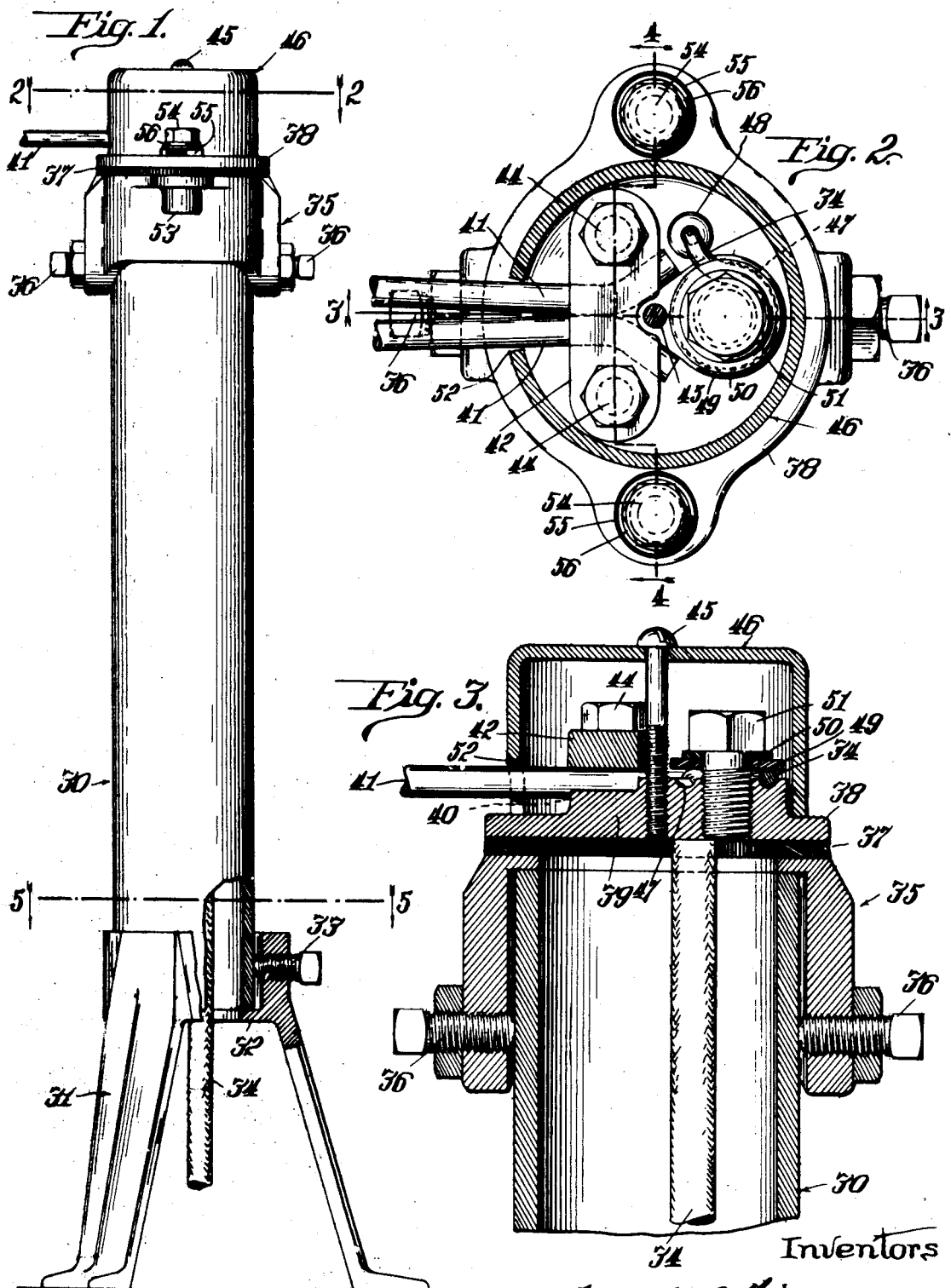

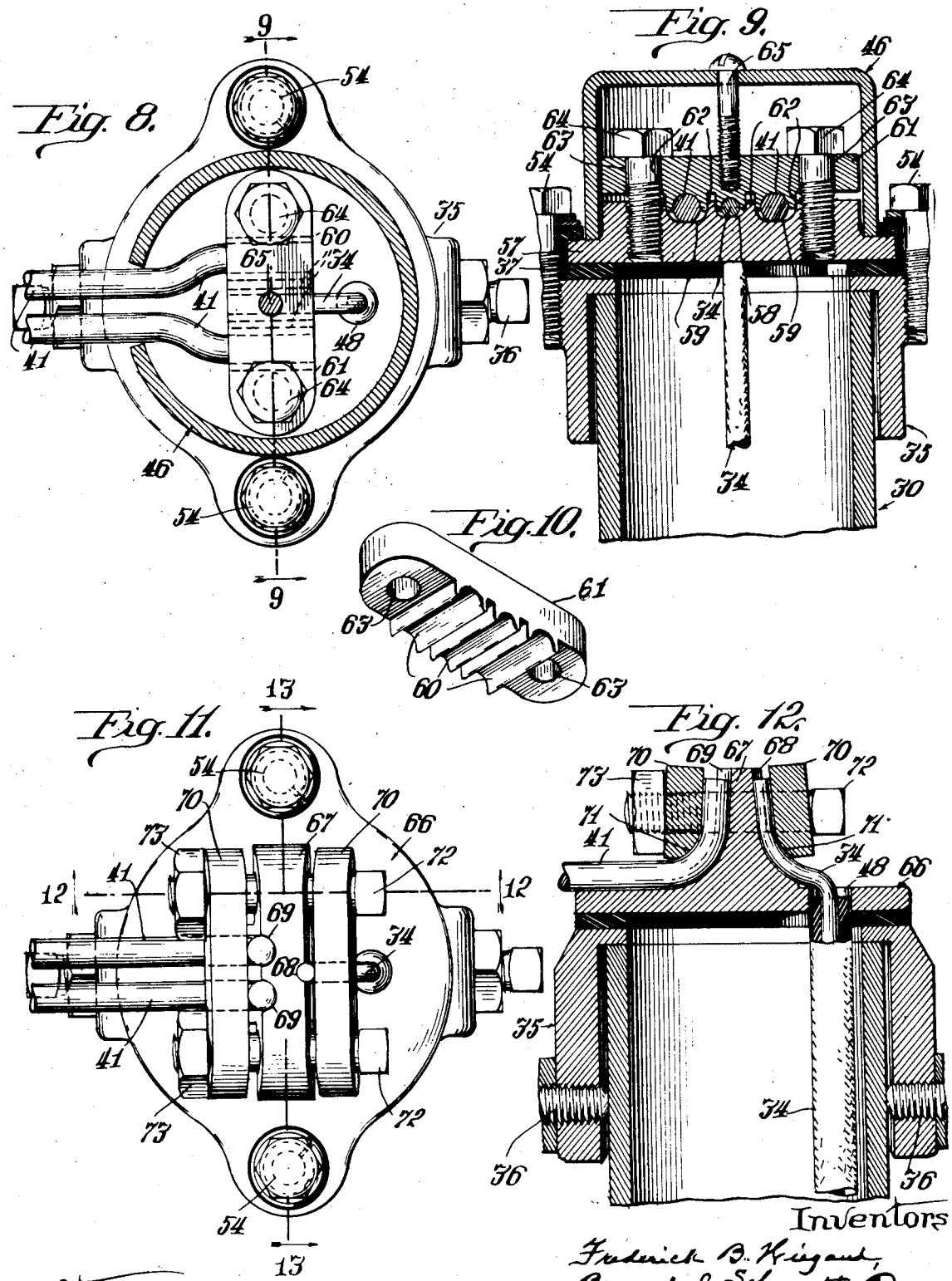

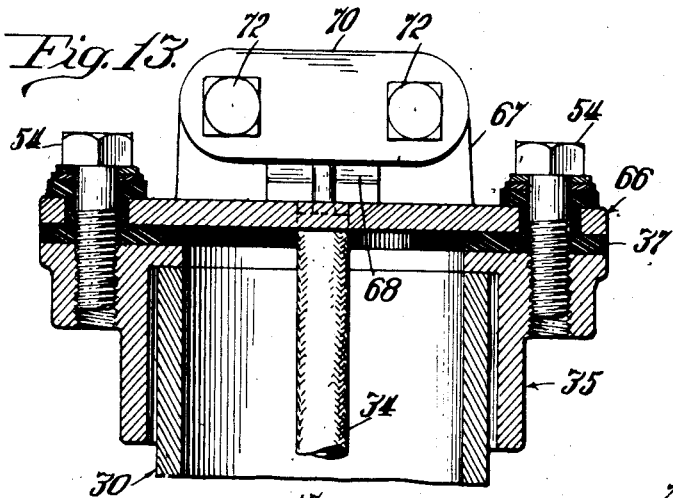
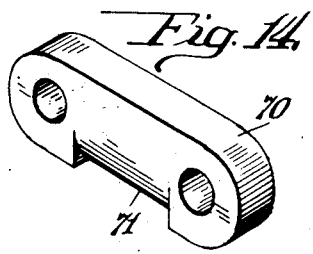
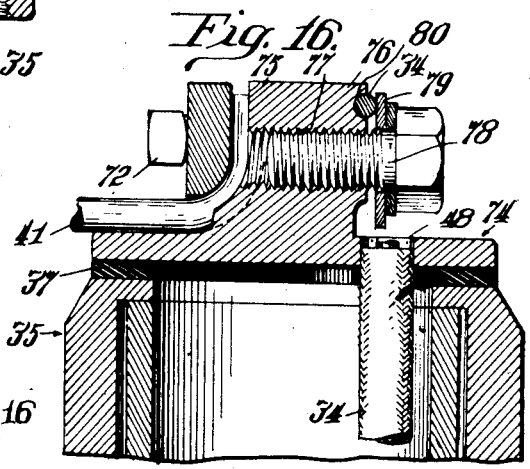
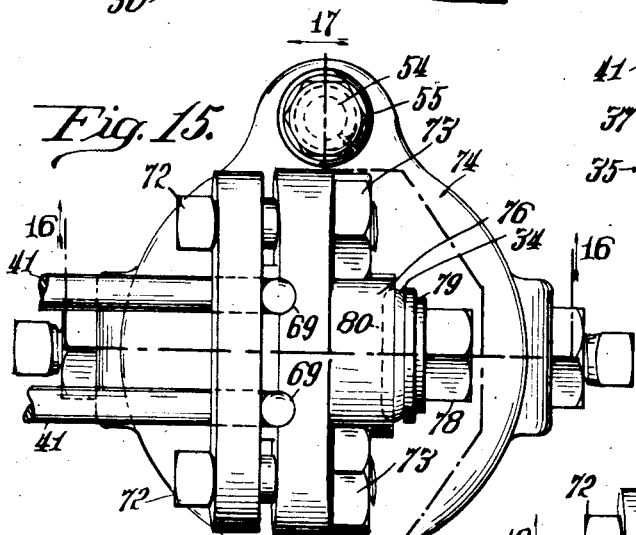
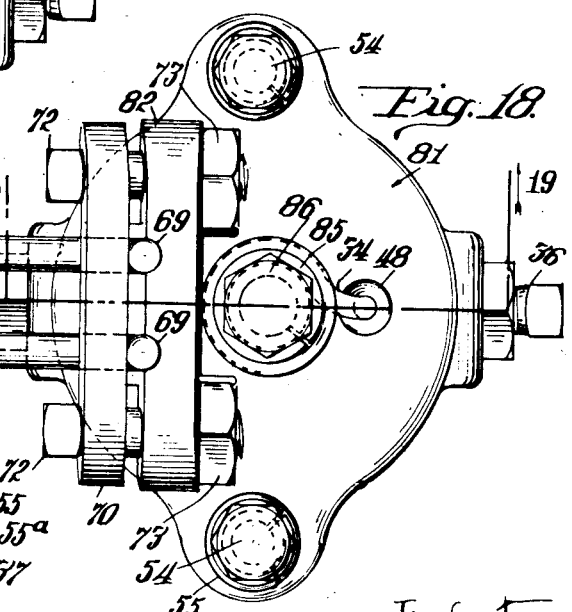

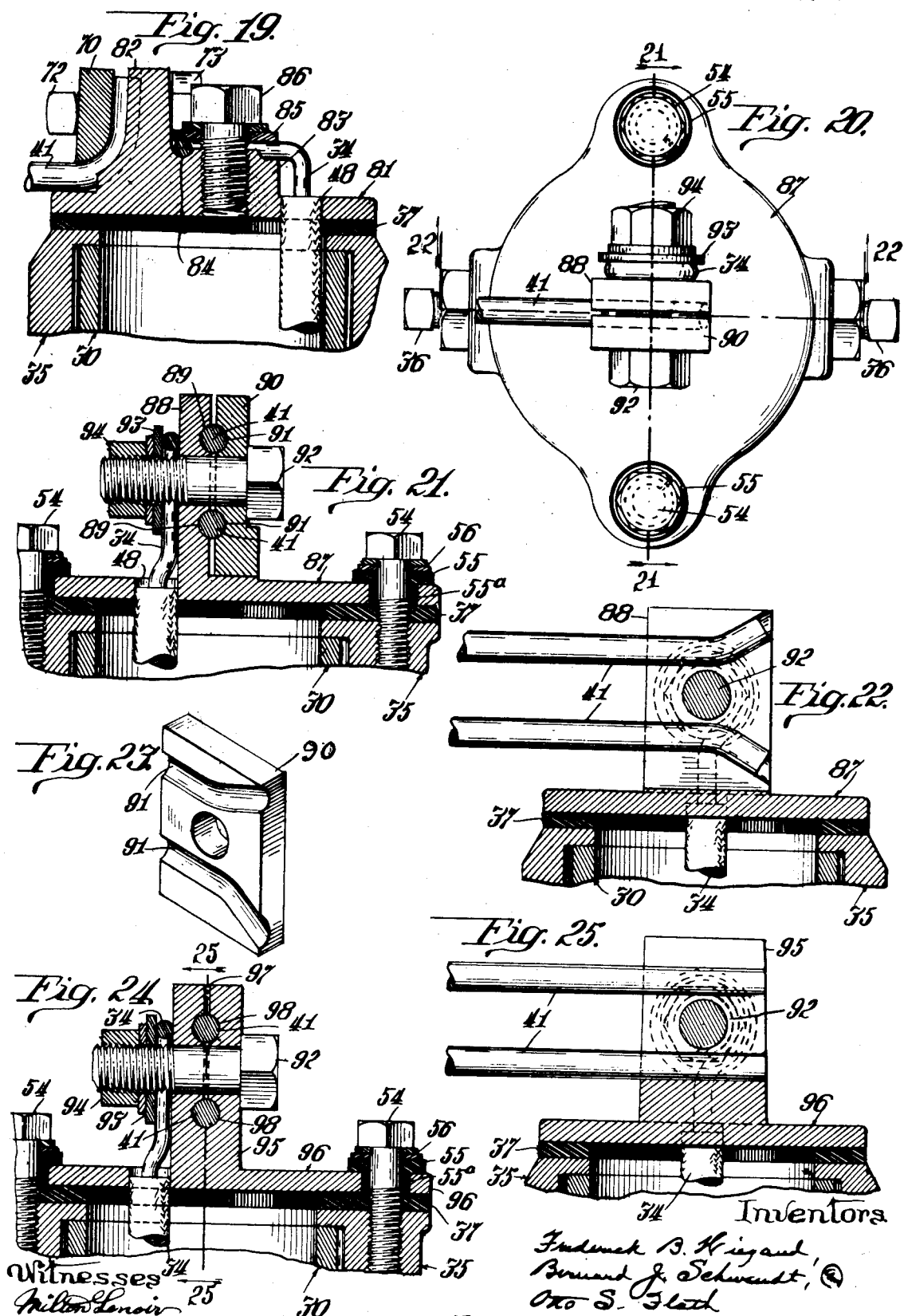

Patented Dec. 4, 1934

1,982,716

UNITED STATES PATENT OFFICE 1,982,716

CABLE OUTLET

Frederick B. Wiegand, Cleveland, and Bernard J. Schwendt, Lakewood, Ohio, and Otto S. Flath, Chicago, Ill.

Application April 30, 1931, Serial No. 534,052

4 Claims. (Cl. 247—1)

Our invention relates more particularly to outlets for cables employed by railroads along the right-of-ways, whereby suitable connections between the current conducting cables and the rails and other devices employed may be quickly and effectively obtained.

The invention involves a suitable standard which may be partially embedded in the ground and through which the main current conductor may be disposed and thereby protected while the end of the main conductor is connected at the upper end of the standard to suitable means which is also adapted to have the lead lines or bond wires connected thereto so as to provide proper current conducting relation between the main conductor and the lines leading from the means.

Our improved means permit proper and easy application to be made and repairs to be readily effected.

The objects and advantages of our invention will be readily comprehended from the detailed description of the accompanying drawings wherein—

Figure 1 is a side elevation of our improved outlet, with a portion broken away and in section to more clearly show construction.

Figure 2 is a cross sectional view taken on the line 2—2 of Figure 1 looking in the direction of the arrows.

Figure 3 is a vertical sectional view taken on the line 3—3 of Figure 2 as viewed by the arrows.

Figure 4 is a sectional view taken on the line 4—4 of Figure 2 as viewed by the arrows.

Figure 5 is a cross sectional view taken on the line 5—5 of Figure 1 as viewed by the arrows.

Figure 6 illustrates the upper portion of a submerged standard with a connection to a track rail which is shown in section.

Figure 7 is a detail perspective view of the wire clamping element employed in Figure 2.

Figure 8 is a view similar to Figure 2 illustrating a modification.

Figure 9 is a sectional view taken on the line 9—9 of Figure 8 as viewed by the arrows.

Figure 10 is a bottom perspective view of the wire clamping member shown in Figure 8.

Figure 11 is a top plan view of another modification.

Figure 12 is a sectional view taken on the line 12—12 of Figure 11 as viewed by the arrows.

Figure 13 is a sectional view taken on the line 13—13 of Figure 11 as viewed by the arrows.

Figure 14 is a perspective view of one of the wire clamping elements used in the construction shown in Figure 11.

Figure 15 is a top plan view of another modification of our invention.

Figure 16 is a sectional view taken on the line 16—16 of Figure 15, as viewed by the arrows.

Figure 17 is a sectional view taken on the line 17—17 of Figure 15 as viewed by the arrows.

Figure 18 is a top plan view showing a further modification of the invention.

Figure 19 is a sectional view taken on the line 19—19 of Figure 18 as viewed by the arrows.

Figure 20 is a top plan view of another form of the invention.

Figure 21 is a sectional view taken on the line 21—21 of Figure 20 as viewed by the arrows.

Figure 22 is a sectional view taken on the line 22—22 of Figure 20 as viewed by the arrows.

Figure 23 is a perspective view of the clamping member employed in the structure shown in Figure 20.

Figure 24 is a sectional view of a modification of the form shown in Figure 20.

Figure 25 is a sectional view taken on the line 25—25 of Figure 24 as viewed by the arrows.

The invention, as exemplified in the first seven figures of the drawings, comprises a suitable tubular standard section 30 which consists of a suitable length of tubing supported at the lower end by a tripod member 31, provided with downwardly diverging legs and laterally disposed foot portions as shown in Figures 1 and 5 to provide suitable support and gripping relation in the ground. The upper or head portion of the tripod 31 is shown provided with an inwardly disposed flange at 32 (Figures 1 and 5) on which the tube or pipe section 30 rests; and the tubular portion or standard section 30 is clamped in place by suitable means as the set-screw 33.

A cable is partially shown at 34 leading upwardly through the tubular portion or pipe section 30 and through the opening in the head piece or member 35. The member 35 is in the nature of a sleeve adapted to freely slip onto the upper end of the tube or pipe section 30 and to be secured in place by suitable set-screws as at 36. The head piece 35 is provided with an opening in its top which is preferably commensurate with the inside diameter of the tube or pipe 30 to permit the cable 34 to freely pass upwardly therethrough. The head piece 35 is provided with a suitable insulating washer 37 on which is seated a suitable conducting top plate 38.

The plate 38 is provided on its upper face with a boss or enlarged portion 39 provided with transversely disposed grooves 40 to receive the conducting wires 41 which lead to the rails, as shown in Figure 6, where the wires 41 are shown secured to the web of the rail indicated at A. The wires 41 are held in the grooves 40 by a suitable clamp plate 42 shown in detail in Figure 7. This plate is provided with suitable apertures at 43, 43 at its ends to receive bolts 44 which screw into tapped openings in the top plate 38, thereby firmly clamping wires 41 in the groove 40. In order to ensure the wires 41 remaining in place, we prefer to bend the ends of the wires laterally, as shown in Figure 2, thereby forming a firm binding relation while at the same time disposing the ends of the wires 41 toward opposite sides of a tapped opening in the base of the conducting top plate 38 to receive a bolt or screw 45 which holds a cap 46 in place; the cap 46 being put in position after the ends of the wires have been properly secured to the conducting plate.

The boss or enlargement 39 of the conducting plate 38 is also provided with an annular groove 47 to receive the end of the cable 34 which is inserted upwardly through the plate 38 through a suitable opening 48, see Figure 2; the end of the cable 34 being curved around in the groove 47 and there held in place by means of a suitable washer 49, locking means or washer 50 and set-screw 51 which screws into a tapped opening in the conducting plate 38 as shown in Figure 3.

With the cable and wire ends secured in place in the manner just described, the cap member or cover is then put into place and secured by the screw 45 previously referred to; one side of the cap 46 being provided with a suitable opening at 52 for passages of the wires 41 therethrough.

The head piece 35, as shown in Figures 3 and 4, is somewhat in the nature of a sleeve which fits over the upper end of the tubular standard section 30 and is provided at opposite sides with ears, as shown at 53 in Figure 4, provided with tapped holes to receive the set-screws 54 which pass through suitable openings formed in the ear portions of the top conducting plate 38 and insulating rings or elements 55, as shown in Figure 4. The set-screws 54 are provided with suitable locking means or washers as at 56 and firmly clamp the top conducting plate to the head piece 35 in a non-conducting or insulated relation, as the set-screws 54 are not only insulatedly related to the top plate 38 by means of the insulating washers 55, but also by the insulating sleeve or ring 55ª so that grounding of the cable or feed wire cannot be effected.

In Figures 8 to 10, we illustrate a modification of our invention insofar as the top conducting plate thereof is concerned and the means for securing the end of the cable and the conducting or lead wires in place.

The tubular standard portion 30, like in the preceding structure, is provided with the head piece 35 which is identical with the structure previously described; the cable extending upwardly and extending through opening 48 in the top plate 57. The top plate is provided with an enlargement or boss having a more or less central groove 58 to receive the end of the cable 34; and on opposite sides of the groove 58 we provide grooves 59, 59 to receive the ends of the lead wires 41, 41. The grooves 58 and 59 are preferably formed somewhat larger than the cross sectional diameter of the wires so as to provide sufficient space on opposite sides of the wires to receive the ribs 60 formed on the lower side of a clamp plate 61; the ribs being spaced apart sufficiently to receive the upstanding shoulders 62 formed at opposite sides of the grooves 58 and 59, 59 in the top plate as shown in Figure 9. The ribs 60 are transversely grooved, as shown in Figure 10, to properly receive the cable and wires. The clamp member 61, like clamp member 42, is provided with suitable apertures 63 to receive set-screws 64, 64, which screw into tapped openings in the top plate 57, thereby firmly holding the clamp member 61 and the cables and wires in place. The clamp plate 61, on its upper face, is provided with a tapped socket or hole extending only partially through the plate to receive holding screw 65 for securing the cap member 46 in place; cap member 46, as heretofore described, being provided at one side with an opening 52, as shown in Figure 8.

The top plate 57, like top plate 38, is insulatedly secured on top piece 35 by the insulating washer 37 being secured in place by the clamp-screws 54 which, in turn, are insulated from the top plate 57 in the manner described in connection with the previously referred to construction.

In Figures 11 to 14, inclusive, we show a further modification of the invention insofar as the top plate is concerned and the manner of securing the ends of the wires in place; the remainder of the device being similar to that heretofore described. In this modification, the top plate 66 is centrally enlarged or provided with an upstanding portion 67 with one face of the upstanding lug portion 67 provided with a groove at 68 to receive the end of the cable 34 which comes up through the opening 48 as in the previous constructions. The opposite face of the upstanding lug portion 67 is provided with a pair of grooves 69, 69 to receive the ends of the two wires 41; the grooves curving outwardly at the bottom in order to better seat the wires. The wires, after being disposed in their respective grooves, are held in place by means of clamp plates 70, 70 arranged on opposite sides of the upstanding lug portion 67. The clamp plates 70 may be identical in construction and are preferably beveled intermediate of the ends on the lower inner edges thereof, as shown at 71, see Figure 14, so as not to present a sharp cutting edge to the wires and at the same time to conform, more or less, to the outward curvature at the base of the upstanding lug portion 67.

The upstanding lug portion 67, adjacent opposite ends thereof, like the clamp plates 70, 70, are provided with suitable openings adapted to register with each other for the purpose of receiving suitable clamp bolts 72, 72, see Figures 11 and 12, whose threaded ends receive the nuts 73. It is apparent that by firmly screwing up the nuts 73 on the bolts 72 both clamp plates 70 will be firmly drawn into clamping relation with the cable and wire ends.

In Figures 15 to 17, inclusive, we show a further modification of the invention insofar as the top plate is concerned and the means for clamping the ends of the wires in place. In this construction, the top plate 74 is provided with an enlargement or upstanding lug portion 75 which is somewhat similar to the upstanding lug 67 in the previously described modification of Figure 11, except that one side or face of the upstanding lug portion 75 and preferably intermediate of its ends is provided with a side enlargement or boss portion 76; the upstanding portion 75, with its enlargement or boss 76, being provided with a tapped opening or hole 77 extending therethrough to receive set-screw 78 which, by means of suitable washer 79, firmly clamps the end of the cable 34 in an annular groove 80 formed in the side face of the boss 76. The top plate 74 is provided with a suitable opening arranged adjacent to the side face of the boss formation 76 so as to permit the end of the cable 34 to be disposed in the groove 80 and about the tapped opening 77 which receives the set-screw 78.

The opposite face of the upstanding portion or lug 75 is provided on opposite sides of the tapped opening 77 with vertically disposed grooves 69, 69 to receive the ends of the wires 41, 41; and the ends of the wires 41, 41 are clamped in place in the grooves by means of clamp plate 70 of construction similar to that disclosed in Figure 14; the clamp plate 70 being held in place by the screw-bolts 72. It will be understood that top plate 74 like the other top plates is secured to the head piece 35 by bolts or screws 54 with or without the insulating member 37 therebetween as heretofore described.

In Figures 18 and 19 we disclose a further modification insofar as the top plate 81 is concerned, which is provided with an upstanding portion or lug 82 preferably arranged toward one side of the top plate; with one face of the upstanding portion 82 provided with the grooves 69, 69 to receive the wires 41, 41 whose ends are bent upwardly into the grooves 69 and are clamped in place by the clamp plate 70 which is of the same construction as that shown in Figure 14 and held in place by the bolts 72. The top plate 81 on the opposite side of the upstanding portion 70 and therefore substantially at the transverse center of the top plate is provided with a boss formation 83 which, on its top, is provided with a circular groove 84 to receive the end of the cable 34, clamped in place by washer 45; the washer being held in clamping relation with the cable 34 by means of a cap-screw 86 which screws into a tapped opening in the boss formation 83 of the top plate 81.

The top plate 81 is provided with the opening 48 to permit the end of the cable wire 34 to come upwardly therethrough and be arranged in the groove of the boss as described.

In Figures 20 to 23, inclusive, we disclose another modification of the invention insofar as the top plate is concerned and a method of electrically securing the ends of the cable and wires. In this form, the top plate 87 is provided with the aperture 48 for the upward passage of the cable wire 34 therethrough and this wire is disposed upwardly against the side face of the upstanding lug 88 formed integral with the top plate 87. The opposite face of the upstanding lug 88 is provided with a pair of transversely disposed grooves 89, see Figure 21, adapted to receive the ends of the wires 41. These wires are clamped in place by means of the vertically disposed plate 90 which is provided with grooves 91 corresponding with grooves 89 for the reception of the ends of the wires 41; and the clamp plate 90 is secured in place by means of bolt 92 which extends through an aperture in the clamp plate 90 and in the upstanding lug 88. The end of the cable 34 is arranged circumferentially about the bolt receiving opening in the upstanding lug 88 and is clamped in place by a suitable washer 93 forced into clamping relation with the cable by screwing up nut 94. In order to ensure the wires from accidentally being withdrawn from the transversely disposed grooves 89 and 91 in the upstanding lug and clamp plate, the ends of the grooves are preferably disposed upwardly and downwardly at one of their ends, as more clearly shown in Figures 22 and 23. The ends of the wires 41 are correspondingly bent, thus ensuring a firm holding of the wires in place.

In Figures 24 and 25, we show a slight modification of the form shown in Figures 20 to 23 in that the upstanding lug 95 of the top plate 96 is partially split vertically as shown at 97 and the split portion provided with the transversely disposed grooves or sockets 98 to receive the ends of the wires 41. After the wires 41 have been inserted, the split portions of the upstanding lug 95 are then drawn together by means of bolt 92 and nut 94; the end of the cable wire 34 having first been placed against the side face of the upstanding lug and the bolt 92 provided with the clamping washer 93 before the nut 94 is applied. It is apparent that when the nut 94 is screwed up the clamping effect will cause the split portions of the upstanding lug to be drawn into clamping relation with the ends of the wires 41 and thus firmly hold them in place.

All the forms are intended for application to the sleeved head piece 35 adapted to be clamped to the upper end of the tubular standard portion or pipe of the support which is intended for imbedment in the ground, as shown in Figure 6; and it should also be understood that all of the types may be provided with a covering cap member 46 when desired; and in all of the constructions the top plates may be insulatedly secured when deemed advisable, to the head piece 35 so as to avoid improper grounding of the circuit. Furthermore, it is apparent that with the constructions shown original installation and application, as well as repairs, may be quickly made and proper conducting circuits provided and readily maintained.

We have shown the various forms of the device provided with an insulating washer beneath the conducting plates; such insulations being desirable if a metallic covered cable is used so as to prevent excess current loss; whereas with insulated cables this will not be necessary; and while the various modifications have been specifically described in certain terms, these terms have merely been used as terms of description and not as terms of limitation, as structural modifications are possible and may be made without, however, departing from the spirit of our invention.

What we claim is:

1. A cable outlet comprising a vertically disposed tubular standard for upward passage of the cable therethrough; a head piece of cup-form invertedly seated on the upper end of the standard and its sides telescoping the upper end of the standard and provided with an open top, means whereby the head piece is removably clamped to the standard; a conducting top plate removably secured on said head piece and having an opening for passage of the cable therethrough, the upper face of said plate having an enlargement and provided with a plurality of grooves to receive the end of the cable and the ends of conducting wires; means whereby said plate is insulated from the head piece; a clamp plate removably secured to said conducting plate whereby the wires are held in the grooves and in conducting relation with the conducting plate; and means for removably securing said clamp plate to the top plate.

2. A cable outlet comprising a tripod base with outwardly disposed legs and feet; a tubular standard seated in the top of said base; an inverted cap top piece removably secured to the upper end of the tubular standard and having an opening therethrough; a conducting plate removably secured on the top piece, said plate having an opening for upward passage of the cable therethrough and provided with an enlargement on its upper face with grooves in said enlargement adapted to receive the ends of the lead wires; means whereby a non-current conducting relation between the conducting plate and the top piece is provided; and a clamp plate removably secured to said enlargement across the grooves for clamping the lead wires in place and maintaining conducting relation between the wires and said conducting plate.

3. In a cable outlet, the combination of a vertically disposed standard for the upward passage of a cable therethrough, a conducting plate adapted to be secured above the upper end of the standard and apertured to receive a current feed wire of the cable, the upper face of the plate being provided with a two part upwardly disposed enlargement having grooves on the opposing faces of said parts to receive the ends of lead wires at least one of said enlargements being an integral part of said conducting plate and adapted to have the feed wire of the cable secured thereto; and means whereby said parts are drawn together in wire clamping relation and the feed wire of the cable clamped in place.

4. In a cable outlet of the character described, the combination of a vertically disposed cable receiving standard; a top piece secured on the upper end of the standard and provided with a cable passage therethrough; a conducting plate apertured to receive the cable wire secured on said top piece but insulated therefrom, with the cable wire conductively secured thereto and provided with a plurality of wire receiving grooves adapted to receive the ends of lead wires; a single plate having grooves on its one face corresponding to the grooves of said conducting plate for combinedly clamping a plurality of wires in said grooves; and means whereby the clamping position of said single plate is controlled.

FREDERICK B. WIEGAND.
BERNARD J. SCHWENDT.
OTTO S. FLATH.